No. 647,820. Patented Apr. 17, 1900.
J. B. FINLEY & B. O. BRANCH.
COMBINED TRUCK AND SACK HOLDER.
(Application filed July 22, 1899.)
(No Model.) 2 Sheets—Sheet 1.
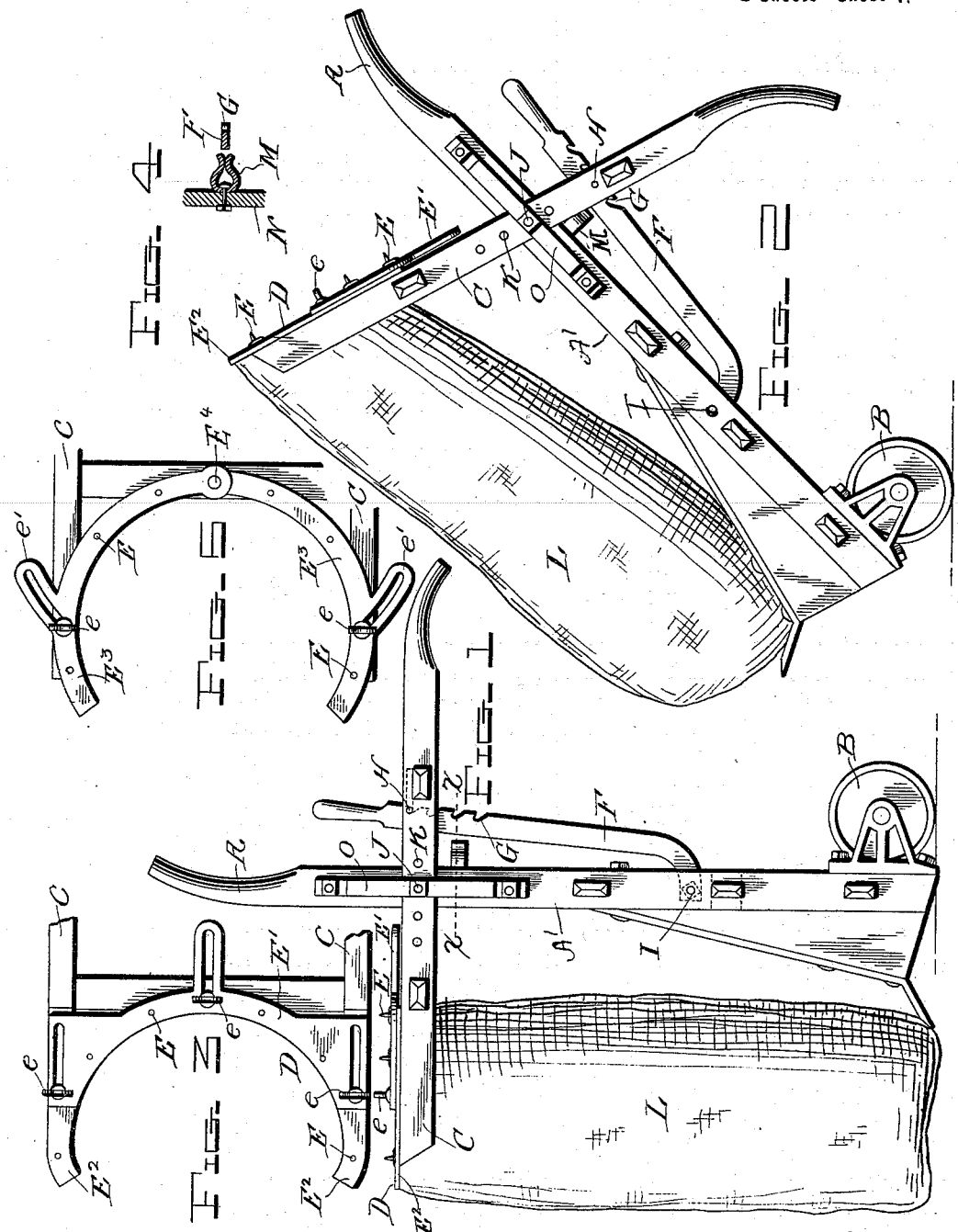
Witnesses
Inventors
Benjamin O. Branch and
John B. Finley
by H. B. Willson & Co.
Attorneys
THE NORRIS PETERS CO., PHOTO-LITHO., WASHINGTON, D. C.

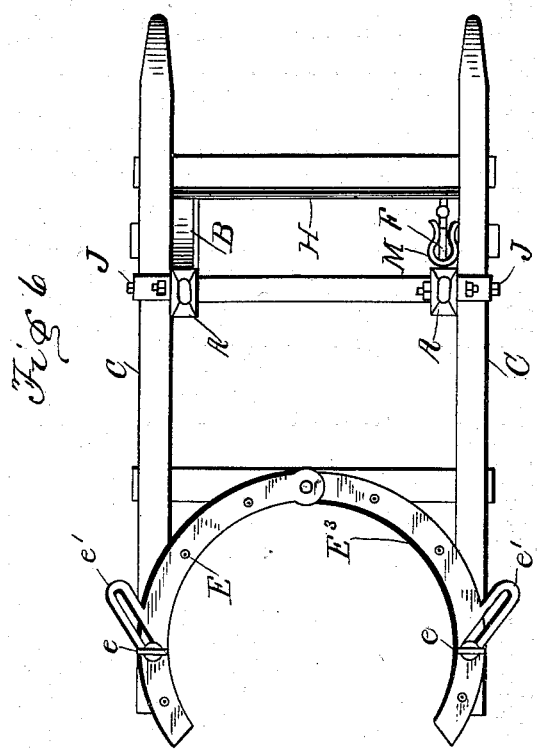

UNITED STATES PATENT OFFICE.

JOHN B. FINLEY AND BENJAMIN O. BRANCH, OF MEMPHIS, TENNESSEE.

COMBINED TRUCK AND SACK-HOLDER.

SPECIFICATION forming part of Letters Patent No. 647,820, dated April 17, 1900.

Application filed July 22, 1899. Serial No. 724,783. (No model.)

*To all whom it may concern:*

Be it known that we, JOHN B. FINLEY and BENJAMIN O. BRANCH, citizens of the United States, residing at Memphis, in the county of Shelby and State of Tennessee, have invented certain new and useful Improvements in a Combined Truck and Sack-Holder; and we do declare the following to be a full, clear, and exact description of the invention, such as will enable others skilled in the art to which it appertains to make and use the same.

The invention relates to improvements in a combined truck and sack-holder.

The object of the invention is to provide a simple, convenient, and effective device whereby the sack can be filled and remain on the truck for transportation to the place of delivery or deposit.

To this end the invention consists in certain features of construction and combination of parts, which will be hereinafter fully described and claimed.

In the accompanying drawings, Figure 1 is a side elevation of our combined truck and sack-holder with a sack in position and ready for filling. Fig. 2 is a similar view showing the position of the truck and sack during transportation. Fig. 3 is a detail plan view of the sack-holder. Fig. 4 is a transverse section on the line X X of Fig. 1. Fig. 5 is another form of the toothed rack. Fig. 6 is a plan view of the apparatus with the bag omitted and the bag-holding arms turned down.

In the drawings the same reference characters indicate the same parts of the invention.

A A denote the truck-handles; A' A', the side bars of the truck; B B, the usual wheels upon which the truck is mounted; and O O, brackets fixed to the outer faces of the side bars, through which the sack-holder arms C C are fulcrumed by means of the pins J J, adjustably secured in the holes K K.

D denotes a semicircular rack provided with spur-teeth E E and fixed to the outer ends of the sack-holder arms C C.

F denotes a hand-lever fulcrumed on the bolt I, fixed in the side bars, and it is provided with a series of hook-shaped notches G G, which engage a transverse rod H, fixed in the sack-holder bars C C.

N denotes a cross-brace fixed in the side bars, and it is provided with a spring-clip M to receive the hand-lever F when not in use.

L denotes the sack, and in operating the device this sack L is fastened in the rack D on the spur-teeth E E. The hand-lever F can be adjusted to suit the length of the sack.

As shown in Fig. 3, the bag-holder rack consists of a rear plate E' and two side plates $E^2$ $E^2$, the plates being slotted to receive the thumb-screws $e$ $e$ $e$, by means of which the holder can be adjusted to different-sized sacks.

In Fig. 5 the holder is formed of two plates $E^3$ $E^3$, hinged on a common pivot $E^4$ and provided with slotted extensions $e'$ $e'$ to receive the thumb-screws $e$ $e$.

The sack having been filled, the truck is thrown back on its wheels, as shown in Fig. 2, to transport the filled sack to the point of deposit, when by releasing the lever F from the rod H the bag-holding arms C C may be raised to lower the rack D and release the sack from the spur-teeth E. The sack-holding arms C C are then restored to their normal position and the device is ready for another sack.

Having thus described the invention, what is claimed, and desired to be secured by Letters Patent, is—

1. In a combined truck and bag-holder, the combination of the truck having the parallel brackets O, O and the notched lever F mounted thereon; the bag-holding arms C, C fulcrumed in said parallel brackets; the semicircular toothed rack D fixed to said bag-holding arms C, C; and the transverse rod H fixed in said bag-holding arms C, C, and arranged to engage said notched lever F, substantially as specified.

2. In a combined truck and bag-holder, the combination of the truck having the parallel brackets O, O and the notched lever F fulcrumed to said truck; the sack-holder arms C, C provided with the orifices K, K; the rod H; the semicircular rack D fixed to said arms C, C and provided with teeth E, E; and the pins J engaging the arms C, C and brackets O, O; substantially as specified.

In testimony whereof we have hereunto set our hands in presence of two subscribing witnesses.

JOHN B. FINLEY.
BENJAMIN O. BRANCH.

Witnesses:
S. R. GRIFFIN,
R. F. ARATA.